Jan. 5, 1960    L. W. POLLOCK ET AL    2,920,113
RECOVERY OF A VAPORIZABLE HYDROCARBON FROM LIQUID MIXTURES
Filed July 27, 1956
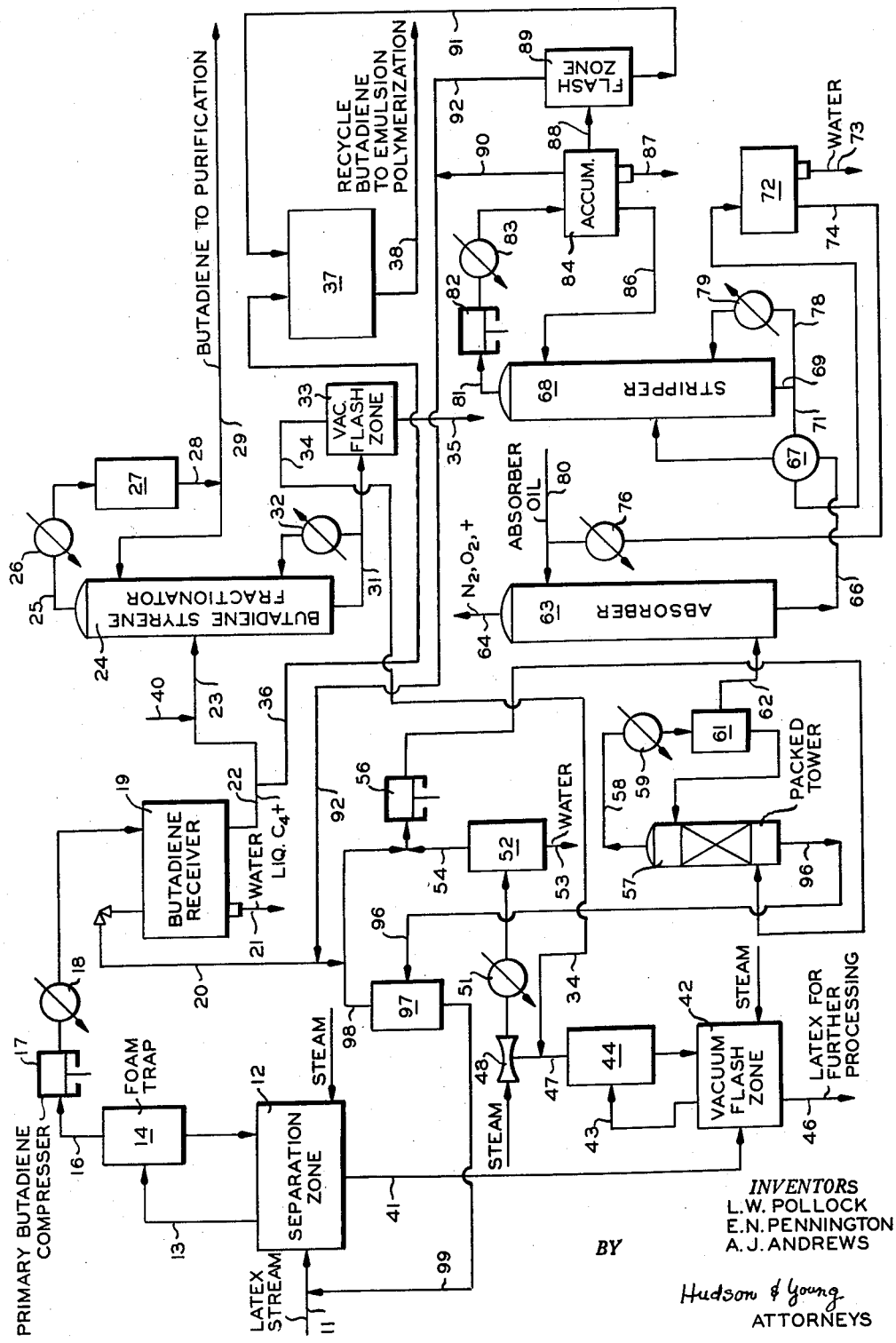
INVENTORS
L.W. POLLOCK
E.N. PENNINGTON
A.J. ANDREWS
BY
Hudson & Young
ATTORNEYS United States Patent Office 2,920,113
Patented Jan. 5, 1960

2,920,113

RECOVERY OF A VAPORIZABLE HYDROCARBON FROM LIQUID MIXTURES

Lyle W. Pollock, Alvin J. Andrews, and Edward N. Pennington, Bartlesville, Okla., assignors to Phillips Petroleum Company, a corporation of Delaware Application July 27, 1956, Serial No. 600,626

12 Claims. (Cl. 260—655)

This invention relates to the recovery of a vaporizable hydrocarbon from a liquid mixture. In one of its aspects, it relates to the purification of a vaporizable hydrocarbon containing a fixed gas impurity.

In the copolymerization of an aliphatic conjugated diene such as butadiene, pentadiene, isoprene, chloroprene, piperylene, methylpentadiene, 2,3-dimethyl-1,3-butadiene, and the like, and a compound polymerizable therewith contains an active $CH_2=C<$ group such as styrene, acrylonitrile, methyl methacrylate, and the like, to produce a synthetic elastomer, unreacted monomers are usually present in the latex. This condition exists whether employing the cold rubber polymerization process or an older higher temperature copolymerization process. When utilizing either of these processes for the production of synthetic elastomers, the monomers not converted in the polymerization reaction are usually recovered from the reaction mixture by vacuum recovery. As is well known in vacuum processes, it is very difficult to exclude all traces of atmospheric oxygen and the recovered monomers from the vacuum recovery steps generally will contain intolerable quantities of free oxygen. Because the contaminating oxygen originates from the atmosphere, the oxygen contaminated monomers usually also contain free nitrogen.

It has been found that oxygen dissolved in the monomers noted above markedly affects the rate of polymerization of these materials. Generally, in a cold rubber process the oxygen is not permitted to exceed 10 parts per million. It has also been found that varying concentrations of dissolved oxygen in, for example, butadiene, and/or styrene, cause the rates of polymerization to vary. Thus, it is difficult to determine whether a batch of butadiene and styrene will copolymerize at the normally expected rate or will copolymerize more rapidly or more slowly than the desired rate. When rates of reaction vary, it is difficult to control the temperature of the reaction and the extent of conversion. The copolymerization reaction is exothermic and too rapid a rate of reaction tends to increase the temperature of the system. In the production of cold rubber, it is especially important to maintain the temperature of the polymerization reaction and the extent of conversion, within relatively narrow limits.

Accordingly, one or more of the following objects will be obtained by the practice of our invention.

An object of this invention is to provide a method for recovering an easily vaporizable hydrocarbon from liquid mixtures containing same.

Another object of this invention is to provide a novel method for purifying a monomer containing a fixed gas impurity.

Still another object is to recover butadiene containing a low free oxygen gas content.

A further object is to provide a process which is relatively economical and efficient, and wherein the equipment requirements are fulfilled in a novel and advantageous manner.

Numerous other objects of the present invention will be apparent to those skilled in the art from a consideration of the specification taken in conjunction with the accompanying drawing.

Broadly, our invention comprises a process of recovering an easily vaporizable hydrocarbon from liquid mixtures by first separating a substantial portion of said vaporizable hydrocarbon, in a first separation zone, introducing the liquid effluent containing the remainder of said vaporizable hydrocarbon to a second separation zone, such as a vacuum flash zone, wherein the remainder of the vaporizable hydrocarbon containing a fixed gas impurity is substantially recovered and passed in contact with a liquid absorbent which selectively adsorbs vaporizable hydrocarbon, and the unabsorbed fixed gas impurity is thereby removed from the absorption operation. The enriched absorbent liquid is subsequently treated to recover the vaporizable hydrocarbon.

In one aspects, our invention relates to recovering a monomer, such as an aliphatic conjugated diene, for example, butadiene, pentadiene, isoprene, chloroprene, piperylene, methyl pentadiene, 2,3-dimethyl-1,3-butadiene, and the like from an emulsion polymerizate. A substantial portion of the monomer is recovered in a first separation zone which is usually effected at a pressure at least atmospheric; the resulting emulsion polymerizate containing minor or residual amounts of monomer is introduced into a flash zone maintained at subatmospheric pressure wherein the remainder of the monomer together with free oxygen impurity and other gases originating from the atmosphere (which have leaked into the vacuum operation) are recovered as a gaseous stream and said stream is passed in contact with a liquid absorbent medium which preferentially absorbs the monomeric material. Free oxygen, nitrogen, etc., are vented from the absorption zone, and the enriched absorbent medium is stripped to recover the monomer therefrom.

The absorbent liquids which are applicable in our invention are a heavy naphtha oil, mineral seal oil, kerosene, light gas oil, furfural, and others known in the art. In general, narrow boiling range hydrocarbon fractions between the hexane and gas oil ranges are applicable, such as a kerosene fraction. The primary requirement is that the absorbent medium must possess a preferential solubility for the hydrocarbon to be recovered. In addition, the absorbent liquid must possess a relatively low volatility so that it is not lost overhead in the absorption and stripping zones; moreover, it is desirable not to employ an absorption liquid which has a relatively high boiling range since the bottoms temperature in the stripping zone would tend to rise, thus creating the problem of diolefin polymerization. Absorbent liquids such as mineral seal oil, furfural, kerosene, and the like are examples of applicable absorber media for our process.

Better understanding of our process will be obtained upon reference to the accompanying diagram which discloses one embodiment of the invention. The figure portrays diagrammatically one arrangement of equipment which can advantageously be employed when carrying out the instant invention. Auxiliary apparatus such as pressure and temperature indicating, recording and control equipment, various valves, pumps, etc., are not shown in the figure for simplicity and brevity purposes. The need for such apparatus, its installation and operation, are well understood by those skilled in the art.

Referring then to the drawing, reference numeral 11 identifies a conduit through which latex passes from a butadiene-styrene copolymer plant into separation zone 12 which is operated at a temperature of approximately 90° F. and a pressure of approximately 20 p.s.i.a. A substantial portion of vaporous butadiene plus a small quantity of styrene is recovered from the latex and is passed overhead via conduit 13 and into foam trap 14 wherein a portion of the butadiene-containing material is recycled back to the separation zone 12. Vaporous butadiene in conduit 16 is introduced into the primary butadiene compressor 17, through cooler 18, and into butadiene receiver 19. Water is removed from the butadiene receiver by pipe 21 and vaporous butadiene is taken overhead and through a pressure relief valve in conduit 20 to be treated as described hereinbelow. Liquid butadiene, including a small quantity of styrene is removed via conduit 22 and a portion thereof is introduced into the butadiene-styrene fractionator 24 by line 23; the remaining portion is diverted through conduit 36 to vessel 37. The particular division of stream 22 will depend upon the quantity of butenes and/or other impurities (if any) present in the stream 22 which will be removed in a purification step, not shown. A polymerization inhibitor can be introduced at 40 into stream 23. Vaporous butadiene is taken overhead from the butadiene-styrene fractionator 24 in conduit 25, through cooler 26 and into reflux accumulator 27. The temperature at the top of the fractionator is 102° F. while the bottoms temperature is maintained at 150° F. The pressure is 65 p.s.i.a. Liquid butadiene is removed from the reflux accumulator 27 via conduit 28 wherein a portion is recycled to fractionator 24 as reflux and the remainder is passed via conduit 29 to a purification recovery stage wherein butenes and/or other impurities are removed (not shown). Liquid styrene and small quantities of butadiene are recovered as bottoms product from fractionator 24 via conduit 31 where a portion thereof is recycled through reboiler 32 to the fractionation zone and the remainder thereof is introduced into vacuum flash zone 33. Vaporous butadiene is taken overhead from zone 33 to be treated as hereinafter described. Liquid styrene and higher boiling materials are removed from zone 33 by pipe 35 for further processing, not shown.

Referring back to the first separation zone 12, liquid effluent containing latex, unreacted styrene monomer, and residual butadiene monomer are removed from zone 12 via conduit 41 and introduced into vacuum flash zone 42. The temperature in said vacuum flash zone 42 is approximately 90° F. and the pressure is about 180 mm. mercury. Residual vaporous butadiene containing free oxygen and nitrogen is removed overhead by pipe 43 and introduced into foam trap 44 wherein a portion of the contents in foam trap 44 is recycled to zone 42. Latex containing substantial quantities of unreacted styrene is removed from vacuum flash zone 42 by conduit 46 to be further processed in means not shown. Steam jet ejector 48 is employed to maintain the vacuum in flash zone 42. Vaporous butadiene and free oxygen and nitrogen are removed from foam trap 44 via conduit 47, and together with vaporous butadiene from conduit 34 the total effluent is passed through steam jet ejector 48 into cooler 51 and subsequently into knock-out drum 52. A water phase is removed via conduit 53 and vaporous butadiene containing free oxygen, nitrogen, etc., is taken overhead via conduit 54. Vaporous butadiene from conduit 20 and conduit 92 (to be discussed hereinafter) is introduced into conduit 98 and the total effluent in conduits 98 and 54 are passed to compressor 56 and subsequently to packed tower 57. Liquid butadiene is recovered as bottoms from tower 57 via conduit 96 and is passed to flash zone 97. Vaporous butadiene is removed overhead via conduit 98 which is connected to conduit 54. Liquid butadiene is taken from flash zone 97 via conduit 99 and is recycled to conduit 11. Vaporous butadiene is removed overhead from tower 57 via pipe 58 through cooler 59 and into accumulator 61. A portion of the liquid butadiene in accumulator 61 is recycled to the upper section of packed tower 57 while vaporous butadiene, free oxygen, nitrogen, etc., are removed from accumulator 61 by pipe 62 and introduced into the lower section of absorber 63 to countercurrent contact with a heavy naphtha oil, introduced via conduit 80 at the upper section of the absorption column. The temperature at the upper portion of the absorption zone is 100° F. and the bottoms temperature is held at approximately 120° F.; the pressure is 110 p.s.i.a. The heavy naphtha oil selectively absorbs the unreacted butadiene monomer, and the enriched heavy naphtha oil is removed from the bottom of absorber 63 via conduit 66, through heat exchanger 67, and is introduced into stripper 68, said stripper being held at a kettle temperature of 265° F. and a top temperature of 49° F. at a pressure of 20 p.s.i.a. Free nitrogen, oxygen, and normally gaseous hydrocarbon impurities are vented from the absorption system through conduit 64. In stripper 68 (a fractionating column) the absorbed butadiene is recovered from the enriched heavy naphtha oil and is taken overhead in a vaporous state via conduit 81, compressor 82 and cooler 83, and is introduced into accumulator 84. Lean heavy naphtha oil is recovered as bottoms product from stripper 68, a portion thereof is passed through conduit 78 into reboiler 79 and recycled to the lower section of the stripping zone. A second stream of the lean heavy naphtha oil is taken via conduit 71, through heat exchanger 67, and is introduced into surge tank 72 wherein water is removed therefrom through conduit 73. The lean absorber oil from surge tank 72 is passed via conduit 74, through cooler 76, to the upper portion of absorber 63 to again be used in the absorption step. Make-up heavy naphtha oil is introduced via conduit 80. In accumulator 84, water is removed therefrom via conduit 87 and liquid butadiene via conduit 86 for reflux to stripper 68. Liquid butadiene is introduced into flash zone 89 via conduit 88. Vaporous butadiene from accumulator 84 and flash zone 89 is taken overhead to further reduce oxygen content of 91 and the combined streams are recycled via conduit 92 to conduit 20. Liquid butadiene is recovered from flash zone 89 via conduit 91 and is introduced into vessel 37. Liquid butadiene is removed from vessel 37 by conduit 38 for recycle to the emulsion polymerization process, not shown.

The following tabulation sets forth the operating conditions of temperature and pressure maintained in various parts of the embodiment described in the figure.

TABLE I

| Apparatus | Temperature, ° F. | Pressure |
|---|---|---|
| Separation zone 12 | 80–120 | 15 to 25 p.s.i.a. |
| Vacuum flash 42 | 80–120 | 100 to 250 mm. mercury. |
| Fractionator 24 | (top) 80–120 / (bottom) 130–200 | 42 to 80 p.s.i.a. |
| Absorber 63 | (top) 80–120 / (bottom) 100–140 | 100 to 125 p.s.i.a. |
| Stripper 68 | (top) 25–90 / (bottom) 150–350 | 15 to 50 p.s.i.a. |

*Example*

A feed stream comprising the reactor effluent from a butadiene-styrene emulsion copolymerization process is introduced into separation zone 12. This stream contains 62,580 pounds per day of unreacted butadiene, together with styrene, water, polymer and the various other ingredients present in the polymerization recipe. Flashing of this stream in zone 12 results in the removal of 50,064 pounds per day of butadiene overhead in line 13. This stream is passed, after compression and cooling, to receiver 19. Butadiene is withdrawn from receiver 19 via line 22, about 44 percent of the stream in line 22 being passed to butadiene-styrene fractionator 24 for the removal of the small amount of styrene contained therein. Butadiene taken overhead from fractionator 24 is passed via line 29 to further purification (not shown). The remainder of the stream in line 22 is passed via line 36 to vessel 37 from which it is recycled to the polymerization reactor. The oxygen content of the butadiene in line 36 is about 1.4 p.p.m. (parts per million).

The liquid stream removed from zone 12 via line 41, containing about 12,516 pounds per day of butadiene is vacuum flashed in zone 42, butadiene being removed overhead therefrom via line 43 at a rate of about 10,013 pounds per day. This latter stream is treated in absorber 63 for the removal therefrom of air, especially oxygen, unavoidably introduced in vacuum flash zone 42. The major portion of the air is vented from the system via line 64. The thus purified butadiene, the overhead product from stripper 68, is flashed in zones 84 and 89 and the liquid phase from this flash zone is passed via line 91 to vessel 37. The oxygen content of this stream has been reduced to 33 p.p.m. by the flashing and absorption and stripping operations. The combined recycle butadiene stream in line 38, including that from both lines 36 and 91, is found to contain only about 6.5 p.p.m. of oxygen.

Thus, it is seen that by the process of this invention, the recovery of unreacted butadiene is effected in an efficient manner by a combination of flashing steps, and that only a small proportion of the recovered butadiene (less than 20 percent) becomes contaminated with oxygen and requires removal of the oxygen by the method described in this application.

It will be apparent that various modifications of the invention can be made upon study of the accompanying disclosure without departing from the spirit and scope of said disclosure.

We claim:

1. A method of recovering an aliphatic conjugated diene from a latex mixture which comprises introducing said latex into a separation zone maintained at a pressure of at least atmospheric, recovering a substantial portion of said aliphatic conjugated diene as a first vaporous overhead stream from said separation zone, introducing the latex effluent from said separation zone to a flash zone maintained at sub-atmospheric pressure, recovering a second vaporous overhead stream comprising aliphatic conjugated diene and free oxygen gas, introducing said second stream into an absorption zone to contact with an absorption solvent, said absorption solvent selectively extracting said aliphatic conjugated diene, removing overhead unabsorbed gases comprising free oxygen gas from the absorption zone, and recovering said aliphatic conjugated diene from said absorption solvent.

2. The method of claim 1 wherein said aliphatic conjugated diene is 1,3-butadiene.

3. The method of claim 1 wherein said aliphatic conjugated diene is piperylene.

4. The method of claim 1 wherein said aliphatic conjugated diene is chloroprene.

5. The method of claim 1 wherein said aliphatic conjugated diene is methylpentadiene.

6. The method of claim 1 wherein said aliphatic conjugated diene is 2,3-dimethyl-1,3-butadiene.

7. A method of purifying butadiene containing a fixed gas impurity which comprises introducing a butadiene-containing latex stream into a separation zone maintained at a pressure of at least atmospheric, removing overhead a vaporous effluent comprising a substantial portion of butadiene and a minor portion of styrene, condensing said overhead effluent, introducing a portion of said condensed effluent to a fractionation zone, withdrawing overhead a product comprising butadiene and withdrawing a bottoms product comprising styrene and small quantities of butadiene from said fractionation zone, and recovering said butadiene from said fractionation bottoms; removing a latex effluent from said separation zone and passing same to a flash zone maintained at sub-atmospheric pressure, recovering overhead a vaporous stream comprising butadiene and a fixed gas impurity from said flash zone, introducing last mentioned overhead stream into an absorption zone to contact with an absorption solvent, said absorption solvent selectively extracting butadiene, removing unabsorbed gases comprising said fixed gas impurity from said absorption zone, and recovering butadiene from the enriched absorption solvent.

8. The method of claim 7 wherein said fixed gas impurity is oxygen.

9. The method of claim 8 wherein the absorption solvent is mineral seal oil.

10. The method of claim 8 wherein the absorption solvent is furfural.

11. The method of claim 8 wherein the absorption solvent is a kerosene fraction.

12. The method of claim 8 wherein the absorption solvent is a gas oil.

References Cited in the file of this patent

UNITED STATES PATENTS

| | | |
|---|---|---|
| 2,415,006 | Hachmuth | Jan. 28, 1947 |
| 2,506,065 | Clark | May 2, 1950 |
| 2,556,851 | Ohsol et al. | June 12, 1951 |
| 2,666,042 | Nozaki | Jan. 12, 1954 |